(12) United States Patent
Stubley et al.

(10) Patent No.: US 8,239,203 B2
(45) Date of Patent: Aug. 7, 2012

(54) ADAPTIVE CONFIDENCE THRESHOLDS FOR SPEECH RECOGNITION

(75) Inventors: Peter Stubley, Lachine (CA); Oded Monzon, Modiin (IL); Alex Gorodetski, Rehovot (IL); Douglas Peters, Pointe-Claire (CA)

(73) Assignee: Nuance Communications, Inc., Burlington, MA (US)

( * ) Notice: Subject to any disclaimer, the term of this patent is extended or adjusted under 35 U.S.C. 154(b) by 726 days.

(21) Appl. No.: 12/423,527

(22) Filed: Apr. 14, 2009

(65) Prior Publication Data

US 2009/0259466 A1 Oct. 15, 2009

Related U.S. Application Data

(60) Provisional application No. 61/045,031, filed on Apr. 15, 2008.

(51) Int. Cl.
*G10L 11/00* (2006.01)
*G10L 15/26* (2006.01)
*G10L 15/18* (2006.01)

(52) U.S. Cl. ............... 704/270; 704/235; 704/257

(58) Field of Classification Search .......... None
See application file for complete search history.

(56) References Cited

U.S. PATENT DOCUMENTS

| | | | | |
|---|---|---|---|---|
| 6,125,345 | A * | 9/2000 | Modi et al. ............ | 704/240 |
| 7,103,542 | B2 * | 9/2006 | Doyle ............... | 704/231 |
| 7,149,687 | B1 * | 12/2006 | Gorin et al. .......... | 704/243 |
| 7,292,982 | B1 * | 11/2007 | Hakkani-Tur et al. ...... | 704/257 |
| 7,657,433 | B1 * | 2/2010 | Chang .............. | 704/252 |
| 7,844,465 | B2 * | 11/2010 | Marcus ............. | 704/275 |
| 7,996,218 | B2 * | 8/2011 | Kim et al. ........... | 704/236 |
| 8,024,188 | B2 * | 9/2011 | Hu et al. ............ | 704/240 |
| 2006/0293886 | A1 * | 12/2006 | Odell et al. .......... | 704/231 |
| 2007/0213978 | A1 * | 9/2007 | Schroer et al. ........ | 704/231 |

OTHER PUBLICATIONS

A.F. Martin, G.R. Doddington, T. Kamm, M. Ordowski, and M.A. Przybocki, "The DET curve in assessment of detection task performance", in Proc. EUROSPEECH, 1997.*
Sankar, Ananth; Kalman, Ashvin; , "Automatic confidence score mapping for adapted speech recognition systems," Acoustics, Speech, and Signal Processing (ICASSP), 2002 IEEE International Conference on , vol. 1, No., pp. I-213-I-216, May 13-17, 2002.*
Marcus, J.N.;, "A novel algorithm for HMM word spotting performance evaluation and error analysis," Acoustics, Speech, and Signal Processing, 1992. ICASSP-92., 1992 IEEE International Conference on , vol. 2, No., pp. 89-92 vol. 2, Mar. 23-26, 1992.*
Timothy J. Hazen, Stephanie Seneff and Joseph Polifroni, "Recognition confidence scoring and its use in speech understanding systems", Computer Speech and Language, vol. 16, issue 1, pp. 49-67, Jan. 2002.*

* cited by examiner

*Primary Examiner* — Brian Albertalli
(74) *Attorney, Agent, or Firm* — Sunstein Kann Murphy & Timbers LLP

(57) ABSTRACT

Adjusting confidence score thresholds is described for a speech recognition engine. The speech recognition engine is implemented in multiple computer processes functioning in a computer processor, and is characterized by an associated receiver operating characteristic (ROC) curve. A results confirmation process interprets user confirmation of speech recognition results within a given confidence score threshold to create a confirmed portion of the ROC curve for the speech recognition engine. A curve extension process extends the confirmed portion of the ROC curve by extrapolation of unconfirmed speech recognition results beyond the confidence score threshold to generate an extended ROC curve. A threshold adjustment process adjusts the confidence score threshold based on the extended ROC curve to meet target operating constraints for operating the speech recognition engine to perform automatic speech recognition of user speech inputs.

20 Claims, 5 Drawing Sheets

ADAPTIVE CONFIDENCE THRESHOLDS FOR SPEECH RECOGNITION

This application claims priority from U.S. Provisional Patent Application 61/045,031, filed Apr. 15, 2008, the contents of which are incorporated herein by reference.

FIELD OF THE INVENTION

The present invention relates to automatic speech recognition, and more specifically to confidence thresholds in such applications.

BACKGROUND ART

Speech recognition applications try to determine the semantic meaning of a speech input. One common example is an automated dialog system in which the system prompts a user to provide a speech input indicating what action to take next. A speech recognition component analyzes the resulting speech input to try to determine its semantic meaning. Typically, statistical speech models are used to determine a sequence of words that best corresponds to the speech input.

Confidence scores can be used to characterize the degree of correspondence between a model sequence and the speech input. FIG. 1 shows a scale of confidence scores along a vertical axis ranging from a high of 1000 to a low of 0. Typically, speech inputs having a confidence score above a given accept threshold are automatically accepted as probably correctly recognized. And speech inputs having a confidence score below a given reject threshold are automatically rejected as probably not correctly recognized. Speech inputs between the two confidence score thresholds may or may not be correctly recognized and usually require confirmation from the user.

Various system performance measurements are used to set the confidence score thresholds. Inputs above the acceptance threshold which are automatically accepted contribute to a Correct Accepted (CA) rate when the identification is correct, and to a False Accepted (FA) rate when incorrect. Similarly, inputs below the rejection threshold which are automatically rejected contribute to a Correct Rejected (CR) rate when the rejection is correct (i.e., the speech input is out of the recognition vocabulary), and to a False Rejected (FR) rate when the rejection is incorrect (i.e., the speech input is within the recognition vocabulary, but not correctly recognized). Inputs between the thresholds which require user confirmation contribute to Correct Confirmed (CC) and False Confirmed (FC) rates.

Ideally, the CA and CR rates should be as high as possible, while the FA and FR rates should be as low as possible, and at the same time, user confirmation, CC and FC should be required as seldom as possible. In practice, this requires compromise and balancing of competing forces. Typically, various operating point criteria are established such as some x % FA, y % FC, z % CA, etc. Then system performance data is collected for one or more test sets. This requires that some criteria be established for recognition correctness. Recognition of the test set is then performed with the final recognition grammar package, and each recognition result is labeled as correct or incorrect. From these results, a Receiver Operating Characteristic (ROC) curve can be determined (FA versus CA). The defined operating points are located on the ROC curve which are used to then set the corresponding thresholds.

FIG. 2 shows an example of setting and using a Receiver Operating Characteristic (ROC) curve to set confidence score thresholds. The horizontal axis is FA rate and the vertical axis is CA rate. In the example shown, the left hand curve plots confidence scores for an in-vocabulary test set and the right hand curve plots confidence scores for a more realistic test with some out-of-vocabulary (OOV) data. Setting an accept threshold to meet a 1% FA operating point would correlate to a confidence score of 835 (out of 1000) and a 69% CA rate in the in-vocabulary data set, but in the more realistic right hand data set with some OOVs, would require a confidence score of 920 and achieve just a 36% CA rate.

The existing threshold setting approach has various disadvantages. For example, speech recognition applications typically use at least one confidence threshold-most have several such thresholds all of which need to be set. Setting these thresholds requires data sets that are specific to each given application. Usually this means live transcribed data which is rather expensive and time consuming to obtain. If the recognition engine, the acoustic models, or the grammar are changed, then the thresholds need to be retuned.

Moreover, if the threshold setting tuning set is too small, the results may not be very robust. Suppose a 1% FA is required. A training set with 100 or more errors is desired, which if FAs form 1% of the test set requires at least 10,000 utterances are necessary for 1% of the test set to be 100 FAs. In addition, for product applications (as opposed to custom on-of applications), different sites have different properties and there is no guarantee that any one site has the same FA performance as another, and there is no guarantee that any given site actually has 1% FA (or whatever the constraint is).

SUMMARY OF THE INVENTION

Embodiments of the present invention are directed systems and methods for adjusting confidence score thresholds for a speech recognition engine. The speech recognition engine is implemented in multiple computer processes functioning in a computer processor, and is characterized by an associated receiver operating characteristic (ROC) curve. A results confirmation process interprets user confirmation of speech recognition results within a given confidence score threshold to create a confirmed portion of the ROC curve for the speech recognition engine. A curve extension process extends the confirmed portion of the ROC curve by extrapolation of unconfirmed speech recognition results beyond the confidence score threshold to generate an extended ROC curve. A threshold adjustment process adjusts the confidence score threshold based on the extended ROC curve to meet target operating constraints for operating the speech recognition engine to perform automatic speech recognition of user speech inputs.

The threshold may be an accept threshold such that speech recognition results having a confidence score below the accept threshold require user confirmation and speech recognition results having a confidence score above the accept threshold are accepted as correct without user confirmation. In addition or alternatively, the threshold may be a reject threshold such that speech recognition results having a confidence score above the reject threshold require user confirmation and speech recognition results having a confidence score below the reject threshold are rejected as incorrect without user confirmation.

The extrapolation may be based on a blind approach without user confirmation of speech recognition results beyond the confidence score threshold. Or a sampling approach may be used having user confirmation of selected speech recognition results beyond the confidence score threshold.

Embodiments of the present invention also include a computer program product implemented in a computer readable storage medium for adjusting operation of a speech recognition engine according to any of the above.

DETAILED DESCRIPTION OF SPECIFIC EMBODIMENTS

Various embodiments of the present invention are directed to systems and methods for automatic adaptive setting and adjustment of confidence score thresholds for speech recognition engines. Specifically, if a speech recognition engine uses recognition confirmation (at least some of the time), then a confirmed portion of the ROC will be directly observable (e.g., below the accept threshold) and provide the basis for adjusting the remaining unobserved portion of the ROC by extrapolation (e.g., above the accept threshold). That in turn allows confidence score thresholds to be set and adjusted that meet the operating requirements based on the adjusted ROC.

Figure 3:
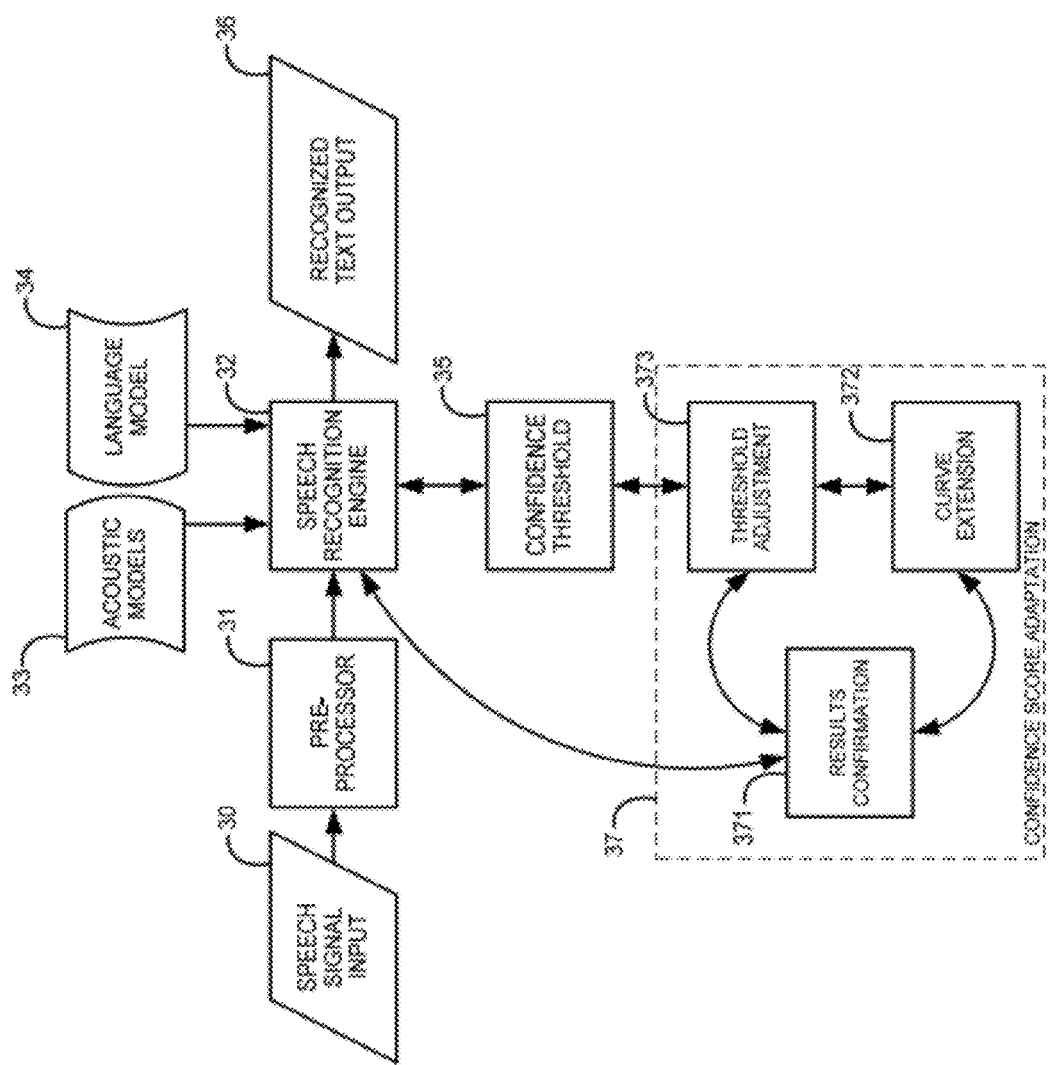
FIG. 3 shows various functional blocks in a speech recognition engine according to an embodiment of the present invention.

FIG. 3 shows various functional blocks in a speech recognition engine 32 according to an embodiment of the present invention, which determines representative text corresponding to input speech. An initial computer process, speech signal input 30, receives a speech input from a user and converts it into a representative electrical signal. For example, this may be based on the use of a conventional microphone. Pre-processor 31 is a computer process that initially converts the speech input signal into a sequence of digital speech frames. Each speech frame can be thought of as a multi-dimensional vector that represents various characteristics of the speech input signal present during a short time window. The speech recognition engine 32 is a set of computer processes that compare the sequence of speech frames to various acoustic models 33 and a language model 34 to determine a representative recognized text output 36 that corresponds to the speech input. As explained above in the background section, this also involves comparing the recognition results to a confidence score threshold 35 that controls whether the recognition results are accepted, confirmed, or rejected.

Figure 4:
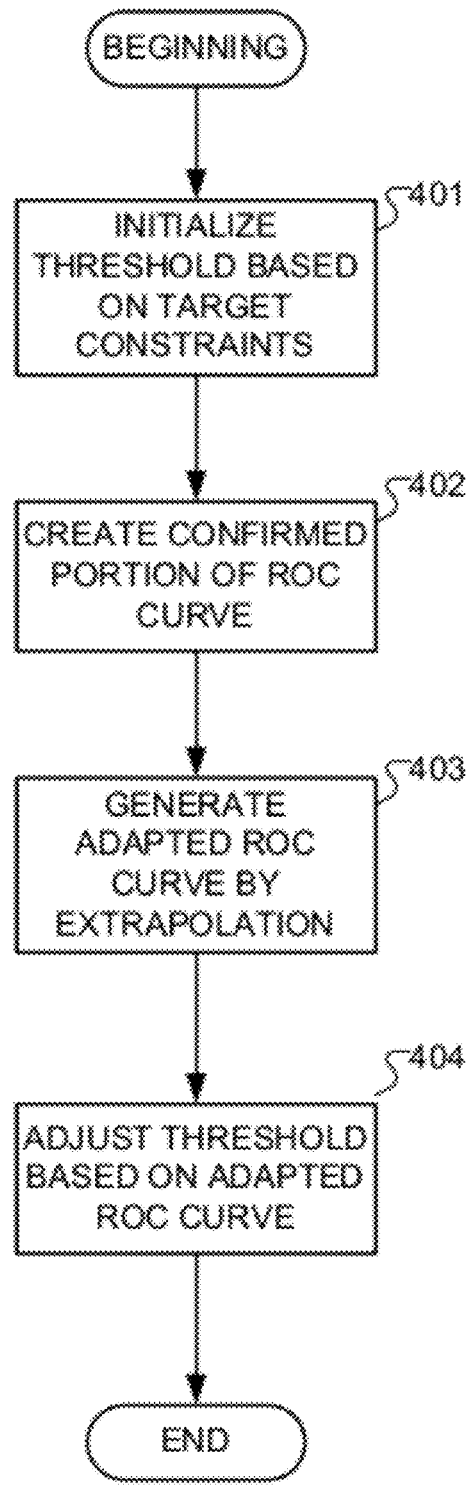
FIG. 4 shows various steps in adaptation of thresholds according to an embodiment of the present invention.

Embodiments of the present invention are directed to adaptation of confidence score threshold 35 by a confidence score adaptation module 37 based on extrapolation of a confirmed portion of a receiver operating characteristic (ROC) curve. FIG. 4 shows various logical steps according to one specific embodiment. Initially, the confidence score threshold 35 is set, step 401, based on target operating constraints such that speech recognition results within the threshold require confirmation by the user. A results confirmation process 371 interprets user confirmation of speech recognition results within a given confidence score threshold to create a confirmed portion of the ROC curve for the speech recognition engine, step 402. A curve extension process 372 extends the confirmed portion of the ROC curve by extrapolation of unconfirmed speech recognition results beyond the confidence score threshold to generate an extended ROC curve, step 403. Then, a threshold adjustment process 39 adjusts the confidence score threshold 35 based on the extended ROC curve to meet target operating constraints for operating the speech recognition engine 32 to perform automatic speech recognition of user speech signal inputs 30.

For example, a pseudo code representation of one specific approach might be set forth as follows:

---

Process ThresholdAdaptation
    for user confirmed speech recognition results within a given
        initial confidence score threshold, $T_i$,
    create confirmed portion of the ROC curve, $C_c$
    for unconfirmed speech recognition results beyond the initial
        confidence score threshold, $T_i$,
    extend confirmed portion of ROC curve, $C_c$ to
    generate extended ROC curve, $C_a$
;    based on extrapolation of unconfirmed speech recognition
;    results beyond the confidence score threshold
    adjust confidence score threshold, $T_a$,
;    based on extended ROC curve, $C_a$ to meet target
;    operating constraints for operating the speech
;    recognition engine to perform automatic speech
;    recognition of user speech inputs.

---

Some embodiments may specifically be based on a blind approach which extrapolates the extended ROC curve for values above the confidence score threshold 35 based on linear interpolation of the results of user confirmations below the confidence score threshold 35, without user confirmation of speech recognition results having confidence scores above the confidence score threshold 35. Operating requirements such as FA can be determined if for each confidence score, the probability of error were known: Pr(e|c). For example, for a given confidence score threshold t, the FA would be $$t = \sum_{c=t}^{1000} Pr(c)Pr(e \mid c).$$

The probability of each confidence score, Pr(c), can be determined for each confidence score value c by looking at each speech recognition result and its confidence score, and then counting the number of occurrences of each confidence score value c. If there is an accept threshold a and a reject threshold r, Pr(e|c) can be estimated between those confidence score thresholds. Above the accept threshold a, Pr(e|c) can be extrapolated based on the confidence score c, and then the FA can be estimated at the accept threshold a using the estimated values of Pr(e|c). This approach can be usefully applied off-line based on sampling of application-specific call logs when it is no longer possible to confirm the result with the caller.

Figure 1:
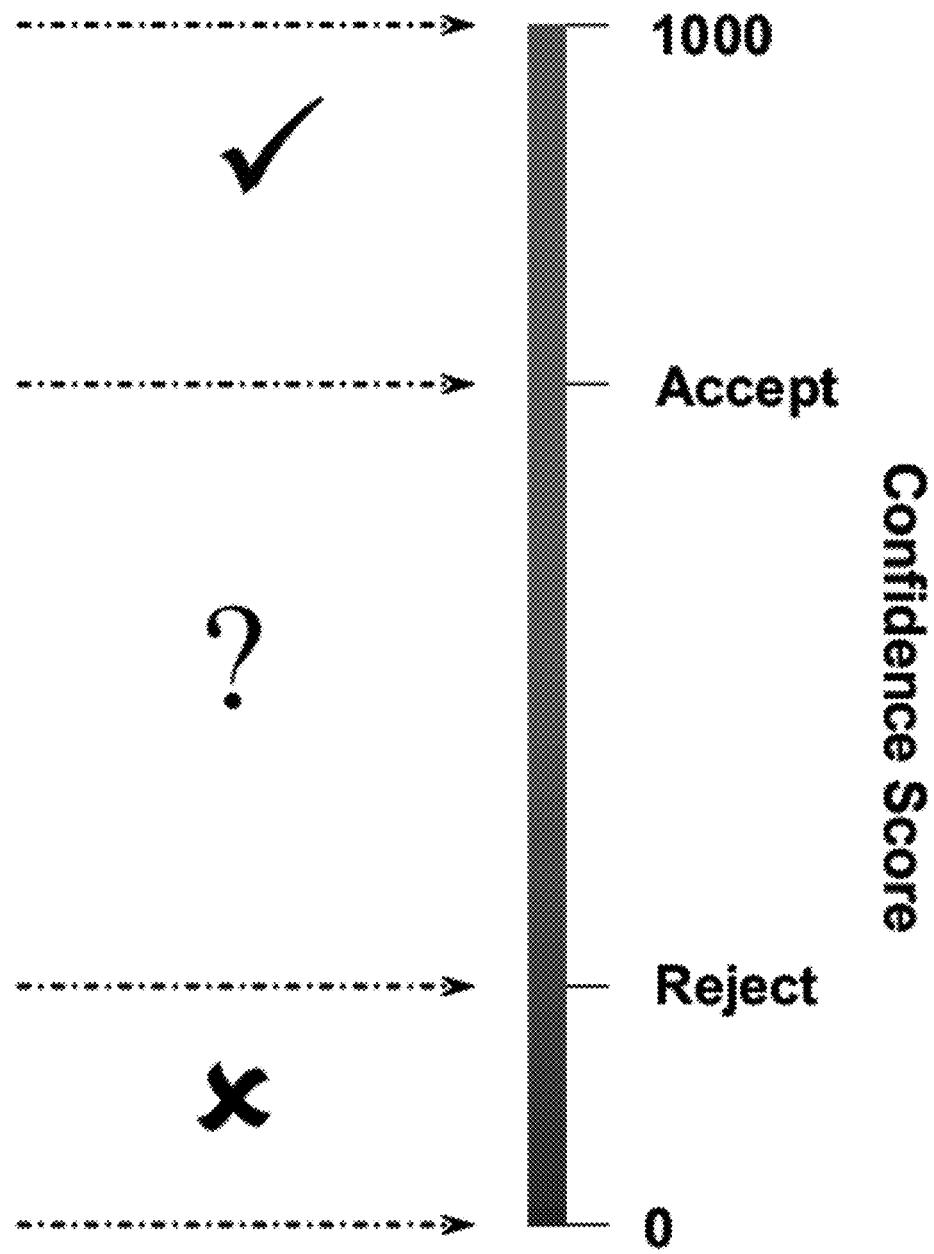
FIG. 1 shows a typical confidence score scale arrangement for use in a speech recognition engine.
Figure 2:
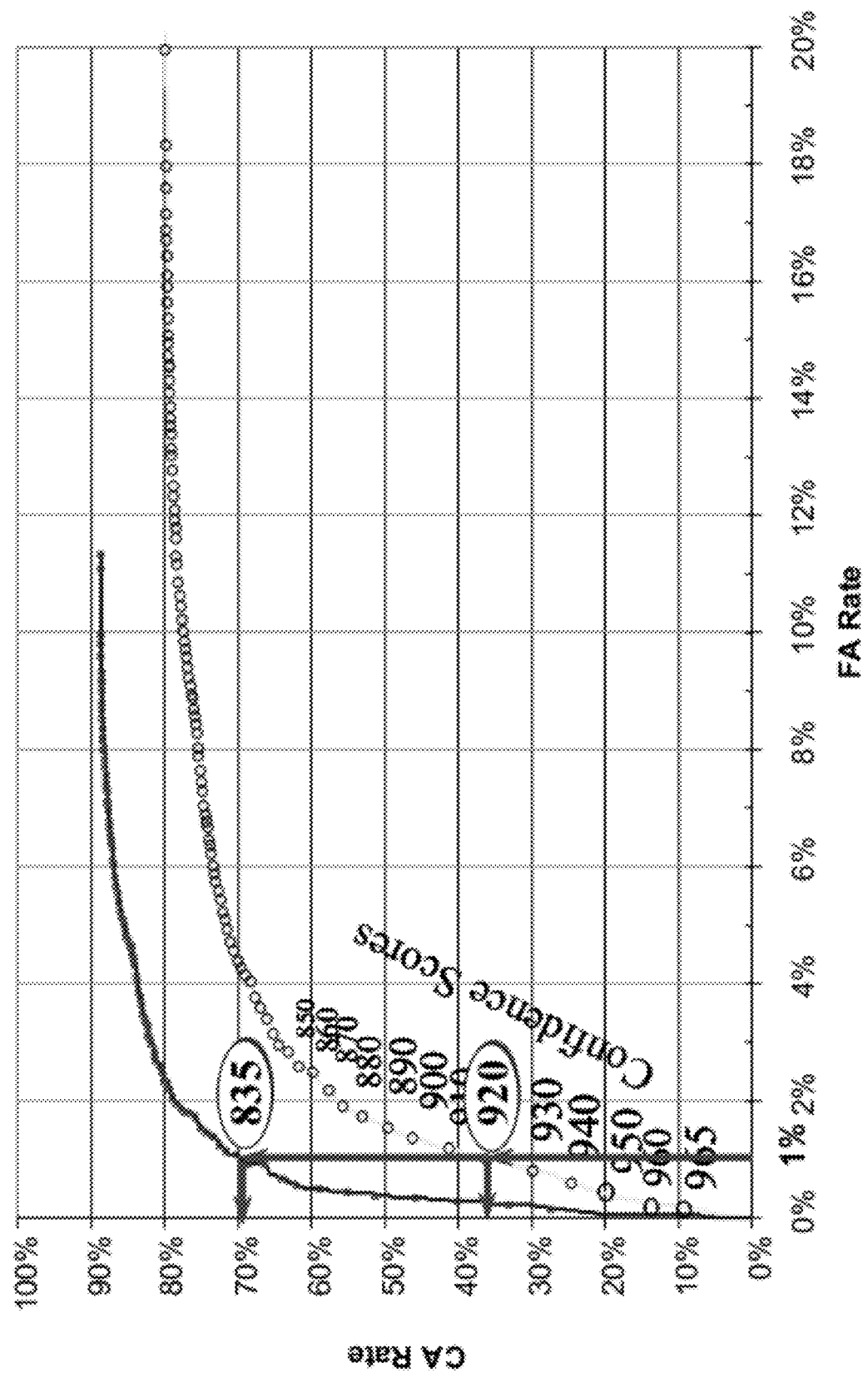
FIG. 2 shows an example of setting and using a Receiver Operating Characteristic (ROC) curve to set confidence score thresholds.
Figure 5:
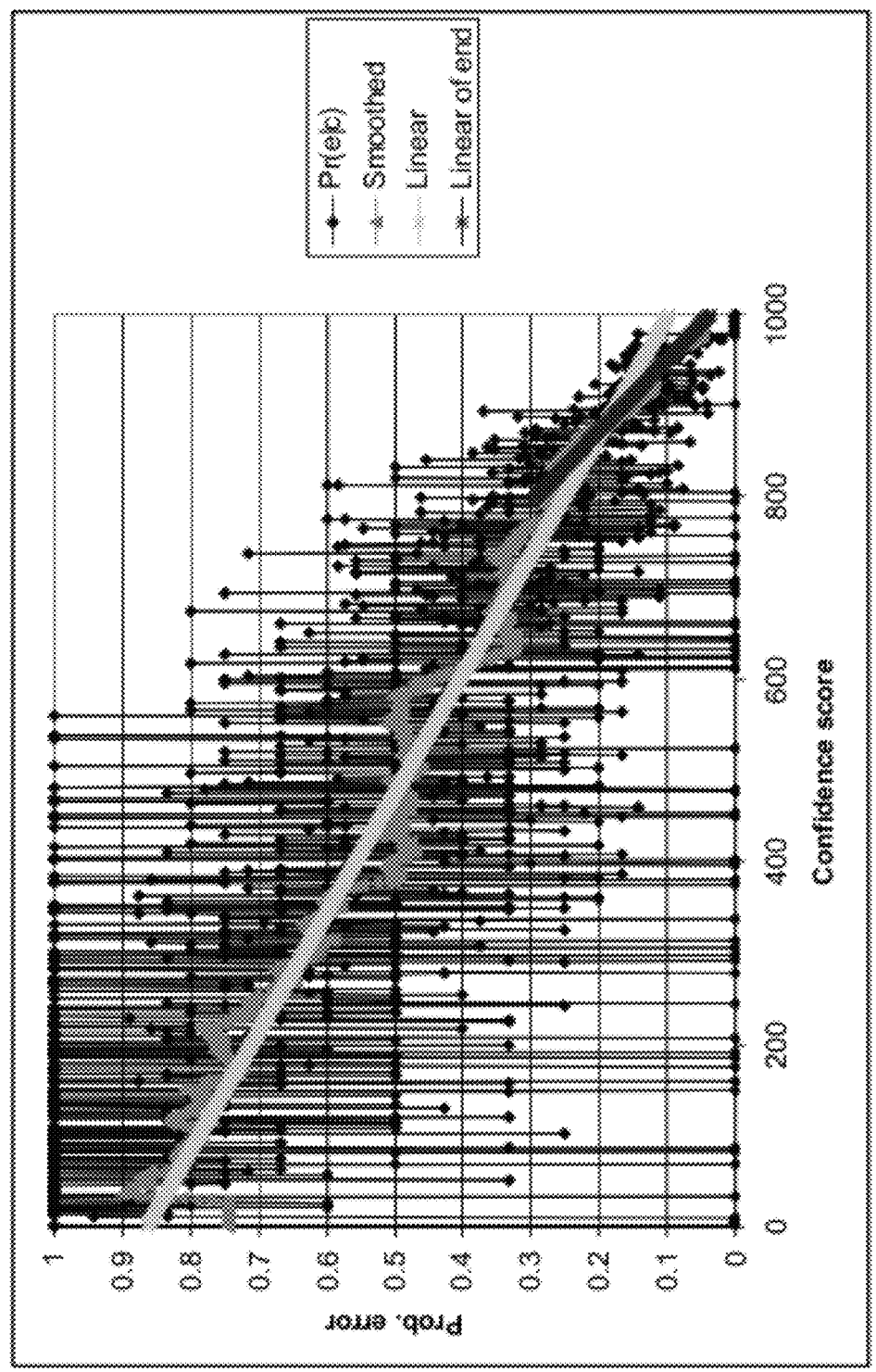
FIG. 5 shows confidence scores for test data reflecting the probability of error.

FIG. 5 shows some example test data for a test set which has speech recognition results for each confidence score value between 0 and 1000 (the horizontal axis) and shows for each such confidence score c, the corresponding probability of error, Pr(e|c) (the vertical axis). These data are plotted on FIG. 5 with the darkest ink showing spikes with diamonds on the end. This data can be smoothed into a more compact visual representation as shown by the thick white line through the data in FIG. 5. The thick light gray line through the FIG. 5 data shows the best linear fit of the data, with the thick dark gray line on the right side showing a more localized linear fit for the far right side of the data. These probability of error graphs, Pr(e|c), can in turn be used to generate ROC curves such as the one shown in FIG. 2 (see the formula for FA above), and can also be used to set the initial values of the confidence score thresholds which meet selected operational constraints such as FA rate, and for periodically recalculating the thresholds until the system performance converges.

In some applications, the confidence score data may be evenly distributed over the entire range of possible scores. In others, the data may be bunched more densely to one side or in one range which would make more difficult the extrapolation for curve extension. However, in such circumstances the confidence score data may be conditioned (e.g., using CDF match operation) to more evenly distribute the observations.

Another embodiment may be based on a random sampling based approach supported by a rich statistical theory. For example, in the context of manufacturing, statistical theory provides answers to questions such as: How many off line samples are needed to ensure a failure rate <X %? In the present case, some of the speech recognition results above the accept threshold a can be selected as samples for user confirmation, and relatively few such samples are necessary to ensure tight bounds on the error rate. Specifically, an initial confirmation score threshold can be selected such that everything below the confidence score threshold 35 is confirmed by the user, and selected samples of speech recognition results above the threshold are also user confirmed. The sampled results can be used to bound the desired operating point (e.g., FA rate) and then the confidence score threshold 35 can be adjusted for the next iteration. As the system nears convergence, the sampling rate can be reduced.

More specifically, for stability and convergence, it may be useful to maintain a set of vectors which are indexed by confidence value in order to accumulate counts of calls, observations, and errors at each confidence value. At any given instant, an estimate of the appropriate threshold is provided by traversing these vectors for the highest confidence value for which the quantity:

$$F = E \frac{C}{N \cdot D}$$

is greater than the target FA rate, where E is the count of errors about a given confidence; N is the count of observations above that confidence, and C/D is a denominator correction in which C is the number of calls above that confidence, and D is the number of total calls. According to statistical theory, the Wilson bounds for the estimate F are:

$$B = \left(\frac{C}{D}\right)\left(p + \left(\frac{z^2}{2N}\right) \pm \frac{z\sqrt{p\frac{1-p}{N} + \frac{z^2}{4N^2}}}{1 + \frac{z^2}{N}}\right)$$

where p=E/N, and z is the norm-inverse value appropriate for the desired confidence. For example, suppose that out of a sample of 1000 calls, that 200 of the calls fall above the initial threshold, and that one quarter of those calls are sampled, such that C=200, D=1000, N=50. If 3 errors are observed inn the 50 samples, then there is a 90% confidence bounds (z=1.6449 for a two-sided confidence interval) of 0.5% and 2.8%. On the other hand, if there were 10,000 calls, with 2000 calls above the initial threshold, and half of those calls were observed with 50 errors, then, the 90% confidence bounds will be between 0.8% and 1.25%. These bounds may be used to reduce the sampling needed, and yield a higher non-confirmed throughput (often a requirement in specific applications). In effect, a relation between the width of the confidence bounds and the sampling rate is maintained, which reduces the sampling as the confidence bounds narrow around the target.

For example, initially, one in every two to four speech signal inputs 30 beyond the confidence score threshold 35 may be sampled with user confirmation (temporarily lowering the CA and/or CR rates). If few recognition errors are observed beyond the initial threshold level, the value of the confidence score threshold 35 can be relaxed and the sampling rate reduced as the system converges. Experimental results used random sampling over several thousand test speech inputs and found quick convergence to an FA rate less than 1%.

Besides the obvious desire for a simple efficient implementation, it is useful to provide some significant direct acceptances from a fresh initial operation of a new application to avoid excessive undesirable confirmations. And the system should rapidly converge independently of the starting confidence score threshold 35 for all speech input volumes, even if the initial threshold is too low or too high. In multi-server site applications, all the servers should be updated synchronously so that all are using the same confidence score threshold 35.

Embodiments of the invention may be implemented in any conventional computer programming language. For example, preferred embodiments may be implemented in a procedural programming language (e.g. "C") or an object oriented programming language (e.g., "C++", Python). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method for adjusting operation of a speech recognition engine implemented as a plurality of computer processes functioning in a computer processor and characterized by an associated receiver operating characteristic (ROC) curve, the method comprising:
   in a first computer process, interpreting user confirmation of speech recognition results within a given confidence score threshold to create a confirmed portion of the ROC curve for the speech recognition engine;
   in a second computer process, extending the confirmed portion of the ROC curve by extrapolation of unconfirmed speech recognition results beyond the confidence score threshold to generate an extended ROC curve; and
   in a third computer process, adjusting the confidence score threshold based on the extended ROC curve to meet target operating constraints for operating the speech recognition engine to perform automatic speech recognition of user speech inputs.

2. A method according to claim 1, wherein the confidence score threshold is an accept threshold such that speech recognition results having a confidence score below the accept threshold require user confirmation and speech recognition results having a confidence score above the accept threshold are accepted as correct without user confirmation.

3. A method according to claim 1, wherein the confidence score threshold is a reject threshold such that speech recognition results having a confidence score above the reject threshold require user confirmation and speech recognition results having a confidence score below the reject threshold are rejected as incorrect without user confirmation.

4. A method according to claim 1, wherein the extrapolation is based on a blind approach without user confirmation of speech recognition results beyond the confidence score threshold.

5. A method according to claim 1, wherein the extrapolation is based on a sampling approach having user confirmation of selected speech recognition results beyond the confidence score threshold.

6. A speech recognition engine implemented as a plurality of computer processes functioning in a computer processor employing at least one hardware implemented computer processor and characterized by an associated receiver operating characteristic (ROC) curve, the engine comprising:
   means for interpreting user confirmation of speech recognition results within a given confidence score threshold to create a confirmed portion of the ROC curve for the speech recognition engine;
   means for extending the confirmed portion of the ROC curve by extrapolation of unconfirmed speech recognition results beyond the confidence score threshold to generate an extended ROC curve; and
   means for adjusting the confidence score threshold based on the extended ROC curve to meet target operating constraints for operating the speech recognition engine to perform automatic speech recognition of user speech inputs.

7. An engine according to claim 6, wherein the confidence score threshold is an accept threshold such that speech recognition results having a confidence score below the accept threshold require user confirmation and speech recognition results having a confidence score above the accept threshold are accepted as correct without user confirmation.

8. An engine according to claim 6, wherein the confidence score threshold is a reject threshold such that speech recognition results having a confidence score above the reject threshold require user confirmation and speech recognition results having a confidence score below the reject threshold are rejected as incorrect without user confirmation.

9. An engine according to claim 6, wherein the extrapolation is based on a blind approach without user confirmation of speech recognition results beyond the confidence score threshold.

10. An engine according to claim 6, wherein the extrapolation is based on a sampling approach having user confirmation of selected speech recognition results beyond the confidence score threshold.

11. A computer program product implemented in a computer readable storage medium for adjusting operation of a speech recognition engine characterized by an associated receiver operating characteristic (ROC) curve, the product comprising:
   program code for interpreting user confirmation of speech recognition results within a given confidence score threshold to create a confirmed portion of the ROC curve for the speech recognition engine;
   program code for extending the confirmed portion of the ROC curve by extrapolation of unconfirmed speech recognition results beyond the confidence score threshold to generate an extended ROC curve; and
   program code for adjusting the confidence score threshold based on the extended ROC curve to meet target operating constraints for operating the speech recognition engine to perform automatic speech recognition of user speech inputs.

12. A product according to claim 11, wherein the confidence score threshold is an accept threshold such that speech recognition results having a confidence score below the accept threshold require user confirmation and speech recognition results having a confidence score above the accept threshold are accepted as correct without user confirmation.

13. A product according to claim 11, wherein the confidence score threshold is a reject threshold such that speech recognition results having a confidence score above the reject threshold require user confirmation and speech recognition results having a confidence score below the reject threshold are rejected as incorrect without user confirmation.

14. A product according to claim 11, wherein the extrapolation is based on a blind approach without user confirmation of speech recognition results beyond the confidence score threshold.

15. A product according to claim 11, wherein the extrapolation is based on a sampling approach having user confirmation of selected speech recognition results beyond the confidence score threshold.

16. A speech recognition engine implemented as a plurality of computer processes functioning in a computer processor employing at least one hardware implemented computer processor and characterized by an associated receiver operating characteristic (ROC) curve, the engine comprising:
   a results confirmation process that interprets user confirmation of speech recognition results within a given confidence score threshold to create a confirmed portion of the ROC curve for the speech recognition engine;
   a curve extension process that extends the confirmed portion of the ROC curve by extrapolation of unconfirmed speech recognition results beyond the confidence score threshold to generate an extended ROC curve; and
   a threshold adjustment process that adjusts the confidence score threshold based on the extended ROC curve to meet target operating constraints for operating the speech recognition engine to perform automatic speech recognition of user speech inputs.

17. An engine according to claim 16, wherein the confidence score threshold is an accept threshold such that speech recognition results having a confidence score below the accept threshold require user confirmation and speech recognition results having a confidence score above the accept threshold are accepted as correct without user confirmation.

18. An engine according to claim 16, wherein the confidence score threshold is a reject threshold such that speech recognition results having a confidence score above the reject threshold require user confirmation and speech recognition results having a confidence score below the reject threshold are rejected as incorrect without user confirmation.

19. An engine according to claim 16, wherein the extrapolation is based on a blind approach without user confirmation of speech recognition results beyond the confidence score threshold.

20. An engine according to claim 16, wherein the extrapolation is based on a sampling approach having user confirmation of selected speech recognition results beyond the confidence score threshold.

\* \* \* \* \*